(12) United States Patent
Seki et al.

(10) Patent No.: US 10,333,151 B2
(45) Date of Patent: Jun. 25, 2019

(54) METHOD FOR PRODUCING GAS DIFFUSION ELECTRODE AND METHOD FOR PRODUCING MEMBRANE ELECTRODE ASSEMBLY (MEA)

(71) Applicant: N.E. CHEMCAT Corporation, Tokyo (JP)

(72) Inventors: Yasuhiro Seki, Bando (JP); Takuya Tsubaki, Bando (JP); Hiroshi Igarashi, Bando (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 107 days.

(21) Appl. No.: 15/567,435

(22) PCT Filed: Apr. 19, 2016

(86) PCT No.: PCT/JP2016/002095
§ 371 (c)(1),
(2) Date: Oct. 18, 2017

(87) PCT Pub. No.: WO2016/170775
PCT Pub. Date: Oct. 27, 2016

(65) Prior Publication Data
US 2018/0114990 A1    Apr. 26, 2018

(30) Foreign Application Priority Data

Apr. 20, 2015 (JP) .................................. 2015-085655
May 25, 2015 (JP) .................................. 2015-105362

(51) Int. Cl.
*H01M 4/92* (2006.01)
*H01M 4/88* (2006.01)
(Continued)

(52) U.S. Cl.
CPC ............ *H01M 4/92* (2013.01); *H01M 4/8807* (2013.01); *H01M 4/8821* (2013.01);
(Continued)

(58) Field of Classification Search
CPC ........................................................ H01M 4/92
See application file for complete search history.

(56) References Cited

U.S. PATENT DOCUMENTS

| | | | |
|---|---|---|---|
| 2001/0024748 A1 | 9/2001 | Mizuno et al. |
| 2002/0034674 A1 | 3/2002 | Starz et al. |
| 2007/0031722 A1 | 2/2007 | Adzic et al. |

FOREIGN PATENT DOCUMENTS

| | | |
|---|---|---|
| JP | 2001-266901 A | 9/2001 |
| JP | 2002-83605 A | 3/2002 |

(Continued)

OTHER PUBLICATIONS

JP2011218278 Translation (Year: 2019).*
International Search Report dated Jul. 19, 2016, issued in counterpart application No. PCT/JP2016/002095. (2 pages).

*Primary Examiner* — Sarah A. Slifka
*Assistant Examiner* — Brian R Ohara
(74) *Attorney, Agent, or Firm* — Westerman, Hattori, Daniels & Adrian, LLP

(57) ABSTRACT

Provided is a method for producing a gas diffusion electrode, with which it is possible to more effectively improve electrode performance, in cases in which a core-shell catalyst is used as an electrode catalyst. This method for producing gas diffusion electrode comprises: a first step in which a support layer having electron conductivity, water-repellency and gas diffusion properties is soaked in water; a second step in which the constituent materials of ink for forming a catalyst layer are put into a mixer and mixed by agitation to prepare an ink for forming a catalyst layer; and a third step in which the ink for forming a catalyst layer is used to form a catalyst (Continued)

layer on the surface of the support layer obtained in the first step. The ink for forming the catalyst layer contains a core-shell catalyst, a polyelectrolyte, water and alcohol. The alcohol is only a polyvalent alcohol.

8 Claims, 3 Drawing Sheets

(51) Int. Cl.
     *H01M 8/1004*         (2016.01)
     *H01M 8/1018*         (2016.01)

(52) U.S. Cl.
     CPC ......... *H01M 4/8828* (2013.01); *H01M 4/926* (2013.01); *H01M 8/1004* (2013.01); *H01M 2008/1095* (2013.01)

(56) References Cited

FOREIGN PATENT DOCUMENTS

| | | | | |
|---|---|---|---|---|
| JP | 2011218278 A | * | 11/2011 | .............. H01M 4/92 |
| JP | 2014-135229 A | | 7/2014 | |

* cited by examiner

METHOD FOR PRODUCING GAS DIFFUSION ELECTRODE AND METHOD FOR PRODUCING MEMBRANE ELECTRODE ASSEMBLY (MEA)

TECHNICAL FIELD

The present invention relates to a method for producing a gas diffusion electrode which is provided with a polymer electrolyte feel cell Also, the present invention relates to a method for producing a membrane electrode assembly (MEA) where the gas diffusion electrode is installed.

BACKGROUND ART

A solid polymer electrolyte fuel cell (Polymer Electrolyte Fuel Cell: hereinafter called "PEFC" as needed) has been developed as a fuel cell vehicle, a home cogeneration system, and the like.

As a catalyst used for the gas diffusion electrode of PEFC, a noble metal catalyst composed of a noble metal of platinum group elements such as platinum (Pt) has been used.

For example, as a typical conventional catalyst, there has been known "Pt on carbon catalyst" which is a powder of catalyst particles where Pt fine particles are supported on an electrically conductive carbon powder (hereinafter called "Pt/C catalyst" as needed).

For example, as the Pt/C catalyst, there has been known a Pt/C catalyst having a Pt support rate of 50 wt %, Trade Name: "NE-F50" available from N. E. CHEMCAT.

In the production costs of PEFC, a proportion of the noble metal catalyst such as Pt is large, and it is the problem to lower the PEFC cost and to spread PEFC.

To solve the problem, developments of technique for lowering the Pt in the catalyst layer of PEFC have been progressed. For example, in Non-Patent Document 1, there is described a summary of the developments until now.

Among these developments, in order to reduce the amount of platinum to fee used, a powder (hereinafter called "core-shell catalyst" as needed) of a catalyst particle having a core-shell structure formed by a core part made of non-platinum element and a shell part made of Pt (hereinafter called "core-shell catalyst particle" as needed) has been studied, and there are many reports.

For example, in Patent Document 1, there is disclosed a particle composite material (corresponding to the core-shell catalyst particle) having a structure where palladium (Pd) or a Pd alloy (corresponding to the core part) is covered with an atomic thin layer of Pt atom (corresponding to shell part). Further in Example of this Patent Document 1, a core-shell catalyst particle having a structure where the core part is a Pd particle and the shell part is a layer made of Pt is described.

Incidentally, the present applicant submits, as publication where the above-mentioned publicly-known inventions are described, the following publication:

PRIOR ART DOCUMENT

Patent Document

Patent Document 1: US Un-examined Patent Application Publication No. 2007/31722

SUMMARY OF THE INVENTION

Problem to be Solved by the Invention

In case that a core-shell catalyst is employed in order to spread the PEFC, when producing a catalyst layer produced by the core-shell catalyst, and a Gas Diffusion Electrode (hereinafter called "GDE" as needed), a Membrane Electrode Assembly (hereinafter called "MEA" as needed), it is important to study the production methods suitable to the core-shell catalyst for improving the performances of the GDE and the MEA.

However, it is necessary to improve the methods for producing the GDL and the MEA which include the core-shell catalyst as the electrode catalyst.

The present invention has been completed under the technical background, and the object of the present invention is to provide a method for producing a gas diffusion electrode which can exactly improve the electrode performances when using the core-shell catalyst as the electrode catalyst.

Further, the object of the present invention is to provide a method for producing a membrane electrode assembly which can exactly improve the battery performances when using the core-shell catalyst as the electrode catalyst.

Means to Solve the Problems

As a result of the present inventors' study of a method for producing a gas diffusion electrode when using the core-shell catalyst as the electrode catalyst, in order to achieve the aforementioned objects, the present inventors have found that it is effective that, when preparing an catalyst layer forming ink, the chemical composition which is designed so as to comply with the conventional Pt/C catalyst is changed, and further, in the step where constitutional materials of the catalyst layer forming ink are mixed with stirring, a mechanical force applied to the core-shell catalyst is reduced and lowered than the force which is designed so as to comply with the conventional Pt/C catalyst, and then the present invention has been completed.

More specifically, the present invention comprises the following technical elements.

Namely, according to the present invention, there can be provided (N1) a method for producing a gas diffusion electrode which is provided with a polymer fuel cell comprises:

a first step for subjecting a supporting body layer having electron conductivity, repellent property and gas diffusion property to a water immersion treatment, a second step for preparing a catalyst layer forming ink by mixing with stirring constitutional materials of the catalyst layer forming ink in a mixer, a third step for forming a catalyst layer on the surface of the supporting body layer obtained in the first step by using the catalyst layer forming ink; and the catalyst layer forming ink comprising:

a core-shell catalyst which contains a support containing an electrically conductive carbon material as a constitutional component, and catalyst particles having a core-shell structure which are carried on the support, a polymer electrolyte, water, and an alcohol;

wherein the alcohol is only a polyhydric alcohol and does not include a monohydric alcohol having 1 to 3 carbon atoms.

The catalyst layer forming ink used in the present invention contains the core-shell catalyst, water and the alcohol (provided that including only the polyhydric alcohol but not including a monohydric alcohol having 1 to 3 carbon atoms). Here, the "polyhydric alcohol" in the present invention means an alcohol other than the monohydric alcohol having 1 to 3 carbon atoms. The present inventors have found that, in case that a catalyst layer forming ink is prepared by using a core-shell catalyst (particularly, using a core-shell catalyst that a core part is a simple Pt as a main component), when comparing the ease that the monohydric alcohol having 1 to 3 carbon atoms is contained as a dispersing medium and the case that the monohydric alcohol is not contained, the performances of the obtained gas diffusion electrode are improved more when the monohydric alcohol having 1 to 3 carbon atoms is not contained.

As to this reason, though the detailed mechanism does not have been solved enough, the present inventors consider as follows. Namely, the monohydric alcohol having 1 to 3 carbon atoms can accelerate agglomeration of the catalyst particles by generating heat when contacting with the catalyst particles of the core-shell catalyst in the step for mixing when preparing the catalyst layer forming ink, in the step for applying the ink when forming the catalyst layer, and thereafter in the drying step. When the catalyst particles agglomerate, only the active metal atom which positions on the outer most surface of the agglomerate contributes to power generation, but the active metal atoms inside the agglomerate cannot contribute to the power generation. Therefore, it seems that the whole (active metal atoms oil catalyst particles in the catalyst layer cannot be utilized fully, which results in lowering of the power generation performance.

On the other hand, the present inventors think that, since the polyhydric alcohol has a low reactivity in comparison with the monohydric alcohol, it is extremely difficult that the phenomenon that the catalyst particles agglomerate occurs, and thus there is no case that the power generation performance is lowered.

As explained above, the catalyst layer forming ink used in the producing method according to the present invention is characterized in that the polyhydric alcohol and water are used as main components of the solvent component without using the usual monohydric alcohol having 1 to 3 carbon atoms.

Further, the producing method according to the present invention is characterized in that the supporting body layer having repellent property is subjected to the water immersion treatment in the first step.

Here, the "water immersion treatment" is a treatment that affinity with the catalyst layer forming ink is ensured temporarily by immersing at least a part of the supporting body layer into water to wet at least a part of the surface of the supporting body layer where the catalyst layer is formed, or by injecting water temporarily under pressure into fine pores near the surface.

As mentioned above, the present inventors have found that, since the catalyst layer forming ink does not contain the monohydric alcohol having 1 to 3 carbon atoms but contains water, when the water immersion treatment is not done, it is difficult to form the catalyst layer on the repellent supporting body layer. Furthermore, the present inventors have found that the catalyst layer can be formed on the supporting body layer, even if the supporting body layer is repellent, by subjecting to the water immersion treatment under a proper pressure.

According to the aforementioned method for producing the gas diffusion electrode of the present invention, the electrode performances can be improved more exactly in case that the core-shell catalyst is used as the electrode catalyst.

Further, the gas diffusion electrode obtained according to the producing method of the present invention is easy to have the structure which has an excellent catalyst activity (polarization property) to contribute to the low cost of the PEFC. The gas diffusion electrode obtained according to the producing method of the present invention can be used as an anode, or can be used as a cathode.

Here, the "core-shell catalyst which contains catalyst particles having a core-shell structure" means a catalyst (powder) that has a structure having the catalyst particles and is formed on the support, wherein the catalyst has a structure where the catalyst particle has a core part formed on the support and a shell part formed so as to cover at least a part of the surface of the core part.

Further, in the present invention, it is preferable that (N2) the polyhydric alcohol is glycoside.

Glyceride is preferable because glyceride is excellent in compatibility with water due to its relatively low carbon atoms, can be obtained industrially stably and cheaply, has remarkably low noxiousness, and is excellent in viscosity adjusting effect.

Further, in the present invention, (N3) the supporting body layer may be a gas diffusion layer (GDL).

Furthermore, in the present invention, (N4) the supporting body layer may be a micro porous layer (MPL).

Namely, the present invention can apply a gas diffusion electrode having a structure where the MPL is disposed between the GDL and the catalyst layer, and in such a case, the supporting body layer of the catalyst layer is the MPL.

Further, according to the present invention, in the producing method of any one of the above (N1) to (N4), it is preferable that, (N5) in the second step, a mass ratio N/C which is a ratio of a mass C of the support of the core-shell catalyst and a mass N of the polymer electrolyte is regulated to 0.5 to 1.5.

When the mass ratio N/C is less than 0.5, a tendency that an enough catalytic activity cannot be obtained becomes large. Also, when the mass ratio N/C is more than 1.5, a tendency that an enough catalytic activity cannot be obtained becomes large.

Further; by adjusting the mass ratio N/C to 0.5 to 1.5, even when the structure of the catalyst particle is changed, it is easy to adjust a viscosity of the catalyst layer forming ink, or a viscosity of the mixture of the ink materials introduced into the mixer for preparing the catalyst layer forming ink into the given range.

Furthermore, according to the present invention, in the producing method of the above (N5), it is preferable that, (N6) in the second step, the catalyst layer forming ink is prepared so as to satisfy the condition shown in the following equation (1) which is determined by referring a second catalyst layer forming ink where only the core-shell catalyst among the constitutional materials included in the catalyst layer forming ink is substituted by a Pt on carbon catalyst, and the N/C is regulated within the range of 0.5 to 1.5;

$$X1 < X2 \tag{1}$$

Wherein, in the equation (1), X1 represents a total mass of the constitutional materials of the catalyst layer forming ink introduced into the mixer, and X2 represents a total mass of the constitutional materials of the second catalyst layer forming ink which is previously required when preparing the second catalyst layer forming ink under the same mixing conditions as in the catalyst layer forming ink excepting the introduced materials.

Accordingly, when using the core-shell catalyst, by reducing the amount (total mass) of constitutional materials of the catalyst layer forming ink to be introduced into the mixer than that of the conventional case that a Pt/C catalyst is used, it is possible to obtain a higher mixing effect.

Further, according to the present invention, in the producing method of the above (N5) or (N6), it is preferable that, (N7) in the second step, the catalyst layer forming ink is prepared so as to satisfy the condition shown in the following equation (2) which is determined by referring a second catalyst layer forming ink where only the core-shell catalyst among the constitutional materials included in the catalyst layer forming ink is substituted by a Pt on carbon catalyst, and the N/C is regulated within the range of 0.5 to 1.5;

$$P1 < P2 \qquad (2)$$

wherein, in the equation (2) P1 represents a stirring power in the mixer, and P2 represents a stirring power in the mixer with respect to the second catalyst layer forming ink which is previously required when preparing the second catalyst layer forming ink under the conditions where the total mass of the constitutional materials to be introduced into the miser is the same.

Accordingly, when using the care-shell catalyst, by lowering the stilling power of the mixer than that of the conventional case that a Pt/C catalyst is used, it is possible to reduce exactly the damage of the core-shell catalyst due to the mixing with stilling.

The stirring power is generally represented by the following equation (3), equation (4). The equation (3) is used in case of representing a stirring power in a so-called turbulent flow area (turbulent Sow stirring area), and the equation (4) is used in case of representing a Stirring power in a so-called laminar flow area (laminar flow stilling area).

$$P = Np \times \rho \times n^3 \times d^5 \qquad (3)$$

$$P = Np \times Re \times \mu \times n^2 \times d^3 \qquad (4)$$

In the equation (3) and the equation (4), P represents a stilling power [W], Np represents a number of power (a value inherent to the mixer and has no unit), $\rho$ represents a density [kg/m$^3$], n represents a rotational speed [rps], d represents a span of wing [m], Re represents a Reynold's number, $\mu$ represents a viscosity [Pa·s].

According to the equation (3) and the equation (4), when the conditions (Np, d, etc.) of the geometrical structure of the mixer are the same, and the viscosity $\mu$, the density $\rho$, and the Reynold's number Re of samples (mixture of constitutional materials of the catalyst layer forming ink) to be introduced into the mixer are made almost same by adjusting the N/C within the above given range, the stilling power can mainly be controlled by the rotational speed.

Further, since a relative weight acceleration Gn applied to a unit weight of the sample in the mixer also depends on the rotational speed of the mixer, it is important to control the rotational speed of the mixer properly. For example, in case that a planetary ball mil is used as a mixer, a rotation of a vessel where the sample is introduced and a revolution of the vessel due to rotation of a disc where the vessel is fixed are generated at the same time. For example, a relative weight acceleration Gn of such a case is represented by the following equation (5).

$$Gn = [rs - [rp \times < (rp/rs) \times (1+iw)^2 > ]] \times (2\pi m/60)^2 / 9.81 \qquad (5)$$

In the equation (5), rs represents a revolution radius, rp represents a radius of a mixer to be used, iw represents a ratio of rotation and revolution, $\pi$ represents a ratio of the circumference of a circle to its diameter, n represents a rotational speed of the revolution.

According to the equation (5), when the conditions of the geometric structure of the mixer are same, it is understood that Gn can mainly be controlled by the rotational speed n of the revolution of the mixer.

Further, the present invention can provide:

(N8) a method for producing a membrane electrode assembly (MEA), which comprises a polymer electrolyte membrane, a gas diffusion electrode arranged on at least one surface of the polymer electrolyte membrane; in the method for producing a membrane electrode assembly (MEA), the gas diffusion electrode obtained by the method for producing the gas diffusion electrode according to any one of the above (N1) to (N7) is used as a part.

According to the method for producing the membrane electrode assembly (MEA) of the present invention, since the gas diffusion electrode which is produced by the method for producing the gas diffusion electrode is used as a part, it is possible to provide a method for producing a membrane electrode assembly which can improve the battery performances when the core-shell catalyst is used as the electrode catalyst more exactly.

Here, when explaining the structure of the electrode catalyst, there is represented by "structure (main structural material) of the catalyst particle supported on the support/structure (main structural material) of the support having electric conductivity". More specifically, there is represented by "structure of the shell part/structure of the core part/structure of the support".

For example, in case that the structure of the electrode catalyst has the structure "the shell part of Pt, the core part of Pd, the support of the electrically conductive carbon", the structure is represented by "Pt/Pd/C".

EFFECTS OF THE INVENTION

According to the present invention, it is possible to provide a method for producing a gas diffusion electrode which can improve the electrode performances when the core-shell catalyst is used as the electrode catalyst more exactly.

According to the present invention, it is possible to provide a method for producing a membrane electrode assembly which can improve the battery performances when the core-shell catalyst is used as the electrode catalyst more exactly.

MODE FOR CARRYING OUT THE INVENTION

Preferable embodiments of the present invention are described in detail hereunder with reference to the drawings when necessary.

Firstly, there are explained the membrane electrode assembly (MEA) and the gas diffusion electrode obtained by the preferred embodiments according to the producing methods of the present invention.

<Membrane Electrode Assembly (MEA)>

Figure 1:
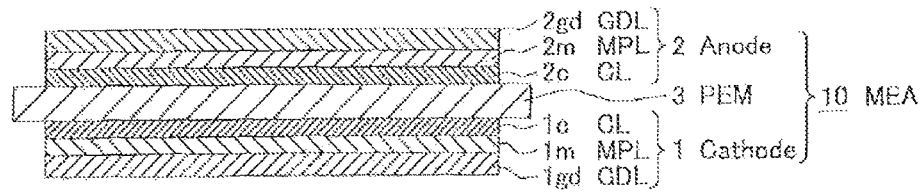
FIG. 1 is a schematic sectional view of one example of the MEA obtained by one preferred embodiment according to the producing method of the present invention.

FIG. 1 is a schematic sectional view of one example of the MEA obtained by one preferred embodiment according to the producing method of the present invention.

The MEA 10 shown in FIG. 1 has a configuration which has two plane gas diffusion electrodes (cathode 1 and anode 2) disposed in the opposite manner to each other, a polymer electrolyte membrane (hereinafter called "PEM" as needed) 3 disposed between the cathode 1 and the anode 2.

The MEA 10 has a configuration where at least one of the cathode 1 and the anode 2 contains the core-shell catalyst explained herein below.

The MEA 10 can be produced by laminating the cathode 1, the anode 2, and the PEM 3 as shown in FIG. 1, and then bonding under pressure.

<Gas Diffusion Electrode (GDE)>

The cathode 1 of the gas diffusion electrode has a configuration where a gas diffusion layer 1gd, and a catalyst layer 1c which is formed on the PEM 3 side of the gas diffusion layer Igd are provided. Further, the cathode 1 has a micro porous layer 1m (hereinafter called "MPL" as needed) which is disposed between the gas diffusion layer 1gd and the catalyst 1c.

In the similar manner as in the cathode 1, the anode 2 of the gas diffusion electrode has a configuration where a gas diffusion layer 2gd, and a catalyst layer 2c which is formed on the PEM 3 side of the gas diffusion layer 2gd, and an MPL 2m which is disposed between the gas diffusion layer 2gd and the catalyst 2c are provided.

(Catalyst Layer (CL))

In the cathode 1, the catalyst layer 1c is a layer where water is yielded by the reaction of an air (oxygen gas) fed from the gas diffusion layer 1gd and a hydrogen ion transported through the PEM 3 from the anode 2.

Further in the anode 2, the catalyst layer 2c is a layer where the hydrogen ion and an electron are yielded from a hydrogen gas transported from the gas diffusion layer 2gd.

At least one of the catalyst layer 1c of the cathode 1 and the catalyst layer 2c of the anode 2 contains the core-shell catalyst.

(Core-Shell Catalyst)

In the following, the core-shell catalyst is explained by referring FIG. 2 to FIG. 5.

Figure 2:
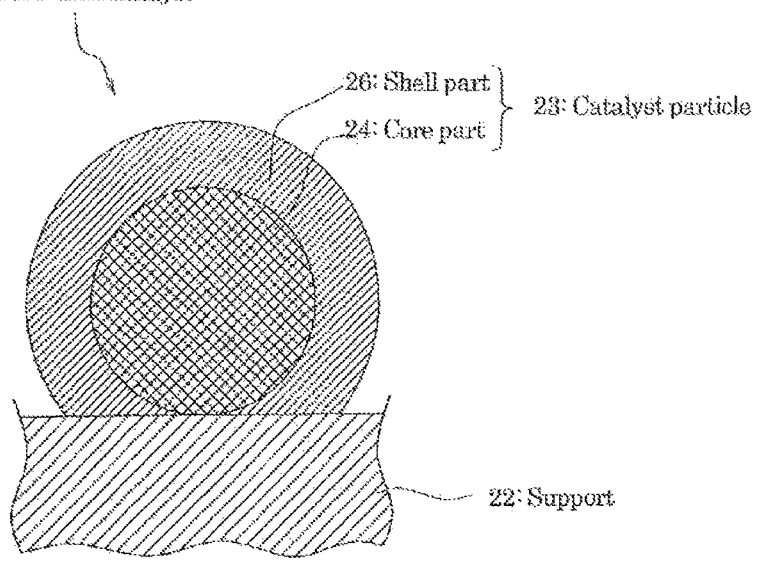
FIG. 2 is a schematic sectional view of one preferred embodiment of the core-shell catalyst which is included in at least one of the cathode catalyst layer and the anode catalyst layer of the MEA shown in FIG. 1.

FIG. 2 is a schematic sectional view of one preferred embodiment of a core-shell catalyst 20 which is included in at least one of the cathode catalyst layer 1c and the anode catalyst layer 2c of the MEA 10 shown in FIG. 1.

As shown in FIG. 2, the core-shell catalyst 20 contains a support 22 and catalyst particles 23 having a so-called "core-shell structure" which are carried on the support 22.

Further, the catalyst particle 23 has a core part 24, and a shell part 26 which is formed so as to cover at least a part of the surface of the core part 24.

Namely, the electrode catalyst 1 has the catalyst particle 23 carried on the support 22, and the catalyst particle 23 has a structure (core-shell structure) where the core part 24 forms a core, and the shell part 5 covers at least a part of the surface of the core part 24 as a shell.

In addition, the elements of the components (chemical composition) of the core part and the elements of the components (chemical composition) of the shell part are different.

In the core-shell catalyst 20, the shell part 26 may be formed on at least a part of the surface of the core part 24 of the catalyst particle 23, and is not particularly limited.

For example, from the viewpoint to obtain the excellent catalyst activity and the durability more reliably, it is preferred that the core-shell catalyst 20 be in a state where the almost of all range of the surface of the core part 24 is covered with the shell part 26, as shown in FIG. 2.

Figure 3:
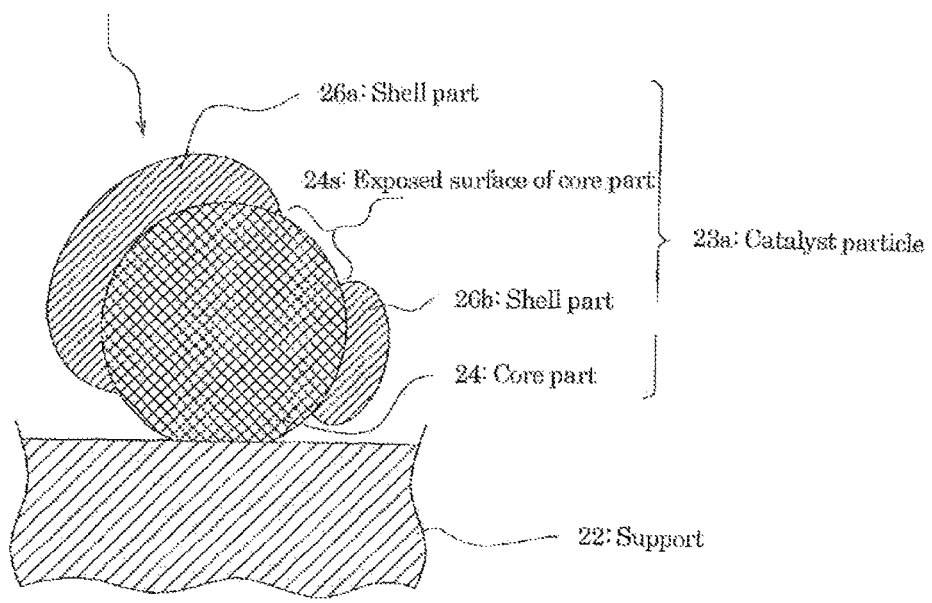
FIG. 3 is a schematic sectional view of the other preferred embodiment of the core-shell catalyst which is included in at least one of the cathode catalyst layer and the anode catalyst layer of the MEA shown in FIG. 1.

FIG. 3 is a schematic sectional view of the other preferred embodiment of the core-shell catalyst 20A which is included in at least one of the cathode catalyst layer 1c and the anode catalyst layer 2c of the MEA 10 shown in FIG. 1.

The core-shell catalyst 20A shown in FIG. 3 has a catalyst particle 23a which is constituted by the core part 24 and the shell part 26 which covers a part of the surface of the core part 24.

Accordingly, within the range where the effects of the present invention can be obtained, in the core-shell catalyst 20A, a part of the core part 24 may be covered by the shell part 26, and the remaining part of the core part 24 (exposed surface 24s of the core part) may be exposed.

Namely, within the range where the effects of the present invention can be obtained, in the core-shell catalyst 20A, at least a part of the surface of the core part 24 may be covered by the shell parts 26a, 26b.

Figure 4:
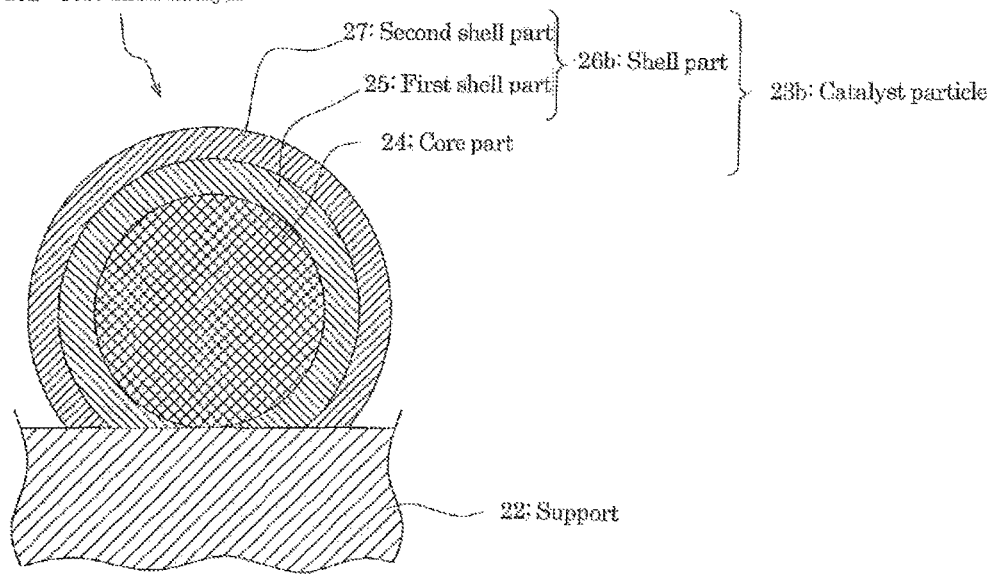
FIG. 4 is a schematic sectional view of the different preferred embodiment of the core-shell catalyst which is included in at least one of the cathode catalyst layer and the anode catalyst layer of the MEA shown in FIG. 1.

FIG. 4 is a schematic sectional view of the different preferred embodiment of the core-shell catalyst 20B which is included in at least one of the cathode catalyst layer 1c and the anode catalyst layer 2c of the MEA 10 shown in FIG. 1.

The care-shell catalyst 20B shown in FIG. 4 has a catalyst particle 23b which is constituted by the core part 24 and the shell part 26b which covers almost of all range of the surface of the core part 24.

Further, the shell part 26b has a configuration which has a first shall part 25 which covers almost of all range of the surface of the core part 24, and a second shell art 27 which cover's almost of all range of the outer surface of the first shell part 25.

The elements of the components (chemical composition) of the core part 24, and the elements of the components (chemical composition) of the first shell part 25 and the elements of the components (chemical composition) of the second shell part 27 are different from each other.

The shell part 26b of the core-shell catalyst 20B may have a configuration where, in addition to the first shell part 25 and the second shell part 27, the other shell part may be disposed inside of the second shell part 27.

For example, from the viewpoint to obtain the effects of the present invention more reliably, it is preferred that the core-shell catalyst 20B be in a state where the almost of all range of the surface of the core part 24 is covered with the shell part 26b, as shown in FIG. 4.

Figure 5:
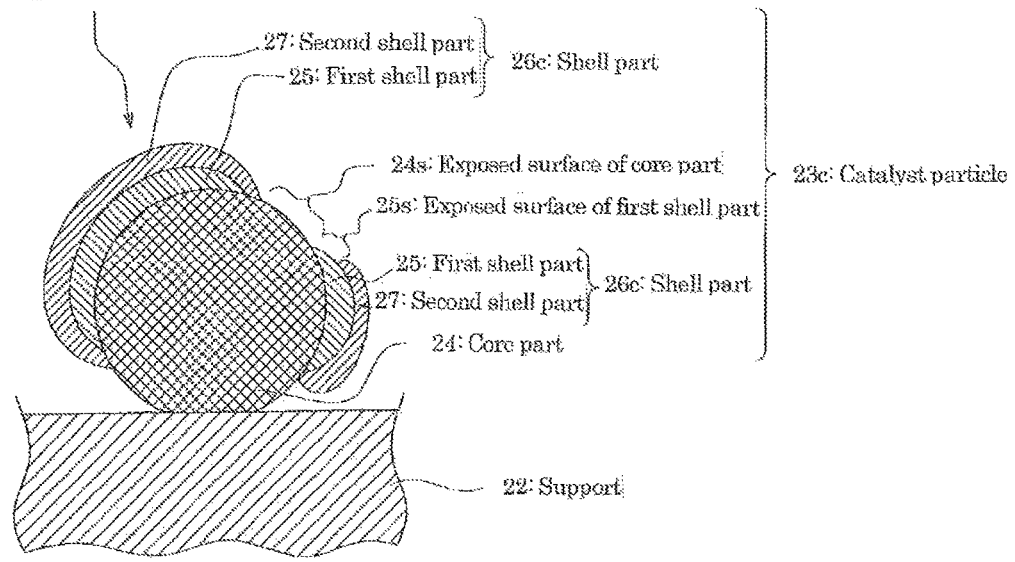
FIG. 5 is a schematic sectional view of the further different preferred embodiment of the core-shell catalyst which is included in at least one of the cathode catalyst layer and the anode catalyst layer of the MEA shown in FIG. 1.

FIG. 5 is a schematic sectional view of the further different preferred embodiment of the core-shell catalyst 20C which is included in at least one of the cathode catalyst layer and the anode catalyst layer of the MEA 10 shown in FIG. 1.

The core-shell catalyst 20C shown in FIG. 5 has a catalyst particle 23c which is constituted by the core part 24 and the shell part 26c which covers a part of the surface of the core part 24.

Further, the shell part 26c shown in FIG. 5 has a double-layered configuration where the first shell part 25 and the second shell part 27 are provided.

In the shell part 26c which constitutes the catalyst particle 23c shown in FIG. 5, there is the first shell part 25 which is not covered by the second shell part 27. Apart of the outer surface of the first shell part 25 which is not covered by the second shell part 27 is an exposed surface 25s of the first shell part.

Here, in the shell part 26c of the catalyst particle 23c, it is preferable that almost of all region of the first shell part 25 is covered by the second shell part 27. The surface of the first shell part 25 of the shell part 26c may be partially exposed (e.g. a state where a part 25s of the surface of the first shell part 25 shown in FIG. 5 being exposed), within the scope where the effects of the present invention can be obtained.

Within the scope where the effects of the present invention can be obtained, the core-shell catalyst may be a state where the "composite of the core part and the shell part where almost of all region of the surface of the core part is covered by the shell part" and the "composite of the core part and the shell part where a part of the surface of the core part is covered by the shell part" exist on the support in a mixed manner.

For example, there may be a state where the core-shell catalysts 20B and 20C shown in FIG. 4 and FIG. 5. Further, within the scope where the effects of the present invention can be obtained, according to the core-shell catalyst of the present invention, there may exist at least two of the care-shell catalysts 20, 20A, 20B and 20C shown in FIG. 2 to FIG.5 in a mixed manner.

Further, within the scope where the effects of the present invention can be obtained, the core-shell catalysts 20, 20A, 20B and 20C shown in FIG. 2 to FIG.5 may be in a state where "particles only composed of the core part where the core part is not covered by the shell part" are supported on the support 22 (not shown), in addition to at least one of the above catalyst particles 23, 23a, 23b, 23c shown in FIG. 2 to FIG.5.

Furthermore, within the scope where the effects of the present invention can be obtained, the core-shell catalysts 20, 20A, 20B and 20C shown in FIG. 2 to FIG.5 may be in a state where "particles only composed of the constituent element of the shell parts" are supported on the support 22 without being in contact with the core part (not shown), in addition to at least one of the above catalyst particles 23, 23a, 23b, 23c shown in FIG. 2 to FIG. 5.

Further, within the scope where the effects of the present, invention can be obtained, the core-shell catalysts 20, 20A, 20B and 20C shown in FIG. 2 to FIG.5 may be in a state where "particles only composed of the core part that are not covered by the shell parts" and "particles only composed of the constituent element of the shell parts" are individually supported on the support 22 (not shown), in addition to at least one of the above catalyst particles 23, 23a, 23b, 23c shown in FIG. 2 to FIG. 5.

Further, from the viewpoint to obtain the effects of the present invention more reliably, it is preferred that the core-shell catalysts 20, 20A, 20B and 20C shown in FIG. 2 to FIG.5 satisfy the following requirements.

Namely, the core-shell catalysts 20, 20A, 20B and 20C shown in FIG. 2 to FIG.5 have a preferred average value of the crystallite size measured by the powder X-ray diffraction (XRD) of 3 to 16.0 nm.

When the average value of the crystallite size is less than 3 nm, it is very difficult to form the particle as the core part 24 on the support 22, and it is very difficult to form the catalyst particle 23 on the support 22.

In addition, when the average value of the crystallite size is more than 16.0 nm, it is very difficult to form the particle as the core part 24 on the support 22 in the highly dispersed state, and it is very difficult to obtain a sufficient catalyst activity.

In the present invention, when the shell part of Pt of the catalyst particle is composed of one or two layers of the Pt atomic layer, the peak of the Pt (111) plane cannot be observed by the XRD, and thus, the average value calculated from the peak of the Pd (111) pane of the core part is deemed to be the average value of the crystallite size of the catalyst particle.

In the core-shell catalysts 20 and 20A shown in FIG. 2 and FIG. 3, it is preferable that the simple Pd is contained in the core part 24. From the viewpoint to obtain the effects of the present invention more reliably, and from the viewpoint to produce easily, etc., the core part 4 is preferably made so as to have the simple Pd as a main component (50 wt % or more), and more preferably made of the simple Pd.

In the core-shell catalysts 20 and 20A shown in FIG. 2 and FIG. 3, it is preferable that the simple Pt is contained in the shell parts 26 and 26a. From the viewpoint to obtain the effects of the present invention more reliably, and from the viewpoint to produce easily, etc., the shell parts 26 and 26a are preferably made set as to haw the simple Pt as a main component (50 wt % or more), and more preferably made of the simple Pt.

In the core-shell catalysts 20B and 20C shown in FIG. 4 and FIG. 5, it is preferable that the simple Pd is contained in the first shell part 25. From the viewpoint to obtain the effects of the present invention more reliably, and from the viewpoint to produce easily, etc., the first shell part 25 is preferably made so as to have the simple Pd as a main component (50 wt % or more), and more preferably made of the simple Pd.

In the core-shell catalysts 20B and 20C shown in FIG. 4 and FIG. 5, it is preferable that the simple Pt is contained in the second shell parts 27. From the viewpoint to obtain the effects of the present invention more reliably, and from the viewpoint to produce easily, etc., the second shell part 2 is preferably made so as to have the simple Pt as a main component (50 wt % or more), and more preferably made of the simple Pt.

Further, in the core-shell catalysts 20, 20A, 20B and 20C shown in FIG. 2 to FIG. 5, the Pt support rate of the catalyst particle is preferably 0.6 to 33.0 wt %, and the Pd support rate is preferably 4.7 to 47.0 wt %.

Furthermore, in the core-shell catalysts 20, 20A, 20B and 20C shown in FIG. 2 to FIG.5, a total support rate of the noble metals of Pt and Pd is preferably 5.6 to 66.5 wt %.

When the Pt support rate is less than 0.6 wt %, a tendency that the sufficient catalytic activity cannot be obtained is increased. Further, since the average thickness of the shell part becomes too thin, the surface of the care part cannot be covered with the shell part sufficiently, and elution of the structural material of the core part- is generated, which results in increasing of a tendency that maintenance of the core-shell structure is difficult.

Further, when the Pt support rate is more than 33.0 wt %, there is increased a tendency that it is very difficult to form the catalyst particles having the core-shell structure on the support in the highly dispersed state. Further, in this case, since the average thickness of the shell part from becomes too thick, it is difficult to obtain the so-called under layer effect (ligand effect) of the core part, and thus there is increased a tendency that it is difficult to obtain the catalytic activity beyond the conventional Pt/C catalyst.

When the Pd support rate is less than 4.7 wt % since the number of the particles which constitute the core part formed on the support is lowered and the area of the shell part formed on the core part is also reduced, there is increased a tendency that a sufficient catalytic activity cannot be obtained sufficiently.

When the Pd support rate is mom than 47.0 wt %, it is very difficult to support the particle which constitutes the core part in the highly dispersed state. As a result, there is increased a tendency that it is difficult to form the catalyst particle having the core-shell structure on the support in the highly dispersed state.

When the total support rate of the noble metals of Pt and Pd is less than 5.6 wt %, there is increased a tendency that the sufficient catalytic activity cannot be obtained.

When the total support rate of the noble metals of Pt and Pd is more than 66.5 wt %, there is increased a tendency that it is very difficult to form the catalyst particle having the core-shell structure on the support in the highly dispersed state.

As the Pt support rate and the Pd support rate, values measured by ICP emission spectrometry are used.

Since the catalyst particles 23, 23a, 23b, 23c shown in FIG. 2 to FIG. 5 of the core-shell catalysts 20, 20A, 20B, and 20C shown in FIG. 2 to FIG. 5 can exhibit an excellent catalyst activity, the outermost shell parts 26, 26a and second shell part 27 have a thickness level being sufficient to exhibit the so-called under layer effect (ligand effect) of the core part 24.

Namely, an average thickness of the shell part (shell parts 26, 26a, the second shell part 27) of core-shell catalyst 20, 20A, 20B, and 20C shown in FIG. 2 to FIG. 5 is preferably 0.2 to 1.0 nm, preferably 0.2 to 0.9 nm, further preferably 0.2 to 0.7 nm, more preferably 0.2 to 0.5 nm.

For example, in case that the shell part (shell part 26, 26a, the second shell part 27) is a layer made of Pt, when the average thickness is within the above range, the layer can be made in a thickness of 4 Pt atomic layers or less, preferably 3 atomic layers or less, more preferably 2 atomic layers or less. The reason is that since the metal bond radius of Pt is 0.139 nm, the average thickness of one Pt atomic layer is around 0.21 nm to 0.23 nm. From other reason, when the lattice coefficient (K) of simple Pt is to be K=0.39231 nm, the plane distance of platinum ($d_{111}$) is 0.2285 nm (=k/√3).

When the average thickness of the shell part (shell parts 26, 26a, the second shell part 27) is less than 0.2 nm, the surface of the core part 24 cannot be covered with the shell part (shell part 26, 26a the second shell part 27) sufficiently, and elution of the structural material of the core part 24 is generated, and thus it is difficult to maintain the core-shell structure. Therefore there is increased a tendency that a sufficient catalyst activity as the core-shell catalyst cannot be obtained. In addition, there is increased a tendency that durability and reliability are also insufficient.

When the average thickness of the shell part (shell parts 26, 26a, the second shell part 27) is more than 1.0 nm, there is increased a tendency that it is difficult to contribute to the cost down (low platinum content) of the PEFC. Further, in this case, there is increased a tendency that it is difficult to obtain the so-called under layer effect (ligand effect) of the core part 24, and thus there is increased a tendency that it is difficult to obtain the catalytic activity beyond the conventional Pt/C catalyst.

Further, the average thickness of the shell port (shell part 26, 26a the second shell part 27) can be calculated by evaluating the average particle size of the catalyst particle and the average particle size of the core part by the SEM image (Scanning Electron Microscopy image) or the TEM image (Transmission Electron Microscopy image). Namely the average thickness of the shell part can be obtained from the difference of the average particle size of the catalyst particle (23, 23a, 23b, 23c) and the average particle size of the core part 24.

Alternatively, the average thickness of the shell part (shell part 26, 26a the second shell part 27) can also be obtained, for example, by measuring the average particle of the catalyst particle (23, 23a, 23b, 23c) and the average particle size of the core part 24 by using the TEM-EDX (Transmission Electron Microscopy-Energy Dispersive X-ray Spectroscopy) in the particle size direction of the catalyst particle, or by using the TEM-EDX (Transmission Electron Microscopy-Energy Dispersive X-ray Spectroscopy) according to the line analysis.

There are no particular restrictions on the support 22, as long as such being capable of supporting the complexes composed of the core parts 24 and the shell part 26 (or the shell part 26a, 26b, 26c), and has a large surface area.

Moreover, it is preferred that the support 22 be that exhibiting a favorable dispersibility and a superior electrical conductivity in a composition used to form a gas diffusion electrode having the core-shell catalyst 20 (or 20A, 20B, and 20C).

The support 22 may be appropriately selected from carbon-based materials such as glassy carbon (GC), fine carbon, carbon black, black lead, carbon fiber, activated carbon, ground product of activated carbon, carbon nanofiber and carbon nanotube; and glass-based or ceramic-based materials such as oxides.

Among these materials, carbon-based materials are preferred in terms of their adsorptivities with respect to the core part 24 and in terms of a BET specific surface area of the support 22.

Further, as a carbon-based material, an electrically conductive carbon is preferred, and particularly, an electrically conductive carbon black is preferred as an electrically conductive carbon.

Examples of such electrically conductive carbon black include products by the names of "Ketjenblack EC300 J," "Ketjenblack EC600" and "Carbon EPC" (produced by Lion Corporation).

The preparation method of the core-shell catalyst 20, 20A, 20B, 20C is not particularly limited, and may be employed a usual method. For example, there is a preparation method which includes the "core part forming step" where the Pd/C particles (powder) that the core particles containing the simple Pd are supported on the support containing the electrically conductive carbon material as the structural component are formed, and the "shell part forming step" where the shell part containing the simple Pt is formed on at least one of the surface of the core particles of the Pd/C particles (powder) obtained by the core part forming step.

The core-shell catalyst 20 and 20A is produced by supporting the core part 24, the shell part 26, 26a which constitute the catalyst particles 23, 23a on the support 22 in this order.

Examples of the production method of the electrode catalyst precursor include an impregnation method where a solution containing the catalyst component is brought into contact with the support 22 to impregnate the support 22 with the catalyst components; a liquid phase reduction method where a reductant is put into a solution containing the catalyst component; an electrochemical deposition method such as under-potential deposition (UPD); a chemical reduction method; a reductive deposition method using adsorption hydrogen; a surface leaching method of alloy catalyst; immersion plating; a displacement plating method; a sputtering method; and a vacuum evaporation method.

The polyelectrolyte contained in the catalyst layer 1c, the catalyst layer 2c is not particularly limited, and a known usual polyelectrolyte can be used. Examples of such polyelectrolyte include known perfluorocarbon resins having sulfonate group, carboxylic acid group. As an easily obtainable hydrogen ion-conductive polyelectrolyte, there can be listed, for example, Nafion (registered trademark of Du Pont), ACIPLEX (registered trademark of Asahi Kasei Chemical Corporation) and Flemion (registered trademark of ASAHI GLASS Co., Ltd).

In addition, at least one of the catalyst layer 1c of the cathode 1 and the catalyst layer 2c of the anode 2 shown in FIG. 1 has a mass ratio N/C where a mass C of the support 22 and a mass N of the polyelectrolyte of 0.5 to 1.2, more preferably the N/C of 0.7 to 1.0.

(Gas Diffusion Layer (GDL))

A gas diffusion layer 1gd which is provided on the cathode 1 shown in FIG. 1 is a layer provided in order to supply an oxidizing agent gas (for example, oxygen gas, air) to the catalyst layer 1c. Further, the gas diffusion layer 1gd has a role for supporting the catalyst layer 1c.

A gas diffusion layer 2gd which is provided on the anode 2 is a layer provided in order to supply a reducing agent gas (for example, hydrogen gas) to the catalyst layer 2c. Further, the gas diffusion layer 2gd has a role for supporting the catalyst layer 2c.

The gas diffusion layers (1c, 2c) shown in FIG. 1 have a function of favorably passing the hydrogen gas or air (oxygen gas) and then allowing such hydrogen gas or air to arrive at the catalyst layer. For this reason, it is preferred that the gas diffusion layer have a water-repellent property. For example, the gas diffusion layer has a water repellent component such as polyethylene terephthalate (PTFE).

There are no particular restrictions on a material that can be used in the gas diffusion layers (1c, 2c), and there can be employed a known material. For example, there may be used a carbon paper; or a material made of a carbon paper as a main raw material and an auxiliary raw material applied to the carbon paper as the main raw material, such auxiliary raw material being composed of a carbon powder as an optional ingredient, an ion-exchange water also as an optional ingredient and a polyethylene terephthalate dispersion as a binder.

(Micro Porous Layer (MPL))

As shown in FIG. 1, in the cathode 1, there is disposed a micro porous layer (MPL) 1m between the gas diffusion layer 1gd and the catalyst layer 1c. The micro porous layer 1m has electron conductivity, water repelling property and gas diffusion property, and is provided in order to promote the diffusion of the oxidizing agent gas into the catalyst layer 1c and the removing of water produced by the reaction in the catalyst layer 1c. The configuration of the micro porous layer 1m is not particularly limited and any known configuration can be employed.

(Polymer Electrolyte Membrane (PEM))

The polymer electrolyte membrane (PEM) 3 shown in FIG. 1 is not particularly limited as far as having hydrogen ion conductivity, and there can be employed known membranes which are conventionally used for the PEFC. For example, there may be a membrane which contains the aforementioned exemplified polyelectrolyte contained in the catalyst layer 1c and the catalyst layer 2c as a constitutional component.

<Modified Embodiments of MEA>

In the above, one example of the MEA obtained according to one preferred embodiment of the producing method of the present invention, but the MEA obtained according to the producing method of the present invention is not limited the configuration of the MEA 10 shown in FIG. 1.

Figure 6:
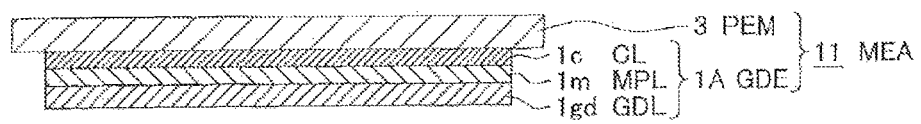
FIG. 6 is a schematic sectional view of the other example of the MEA obtained by one preferred embodiment according to the producing method of the present invention.

For example, the MEA may have a configuration of an MEA 11 shown in FIG. 6.

FIG. 6 is a schematic sectional view of the other example of the MEA obtained by one preferred embodiment according to the producing method of the present invention. The MEA 11 shown in FIG. 6 has a configuration where a gas diffusion electrode (GDE) 1A which has the same configuration as the cathode 1 of the MEA 10 shown in FIG. 1 is disposed only on one surface of the polymer electrolyte membrane (PEM) 3. Provided that, the catalyst layer 1c of the gas diffusion electrode (GDE) 1A has the configuration of the catalyst layer according to the present invention. Namely, the catalyst layer 1c of the GDE 1A has a mass ratio N/C where a mass C of the support of the core-shell catalyst and a mass N of the polyelectrolyte of 0.5 to 1.2, more preferably of 0.7 to 1.0.

<Gas Diffusion Electrode (GDE)>

Next, the gas diffusion electrode (GDE) is explained.

Figure 7:
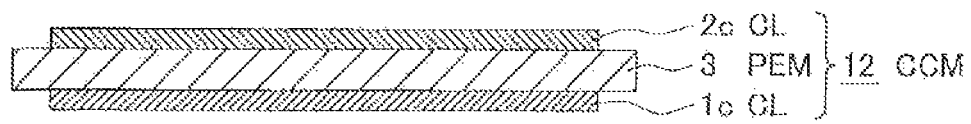
FIG. 7 is a schematic sectional view of one example of the GDE obtained by one preferred embodiment according to the producing method of the present invention.

FIG. 7 is a schematic sectional view of one example of the GDE obtained by one preferred embodiment according to the producing method of the present invention. The gas diffusion electrode (GDE) 1B shown in FIG. 7 has the same configuration as the cathode 1 mounted on the MEA 10 shown in FIG. 1. Provided that, the catalyst layer 1c of the gas diffusion electrode (GDE) 1B has the configuration of the catalyst layer according to the present invention. Namely, the catalyst layer 1c of the gas diffusion electrode (GDE) 1B has a mass ratio N/C where a mass C of the support of the core-shell catalyst and a mass N of the polyelectrolyte of 0.5 to 1.2, more preferably of 0.7 to 1.0.

<Modified Embodiments of Gas Diffusion Electrode (GDE)>

In the above, one example of the GDE, but the GDE is not limited the configuration of the GDE 1B shown in FIG. 7.

Figure 8:
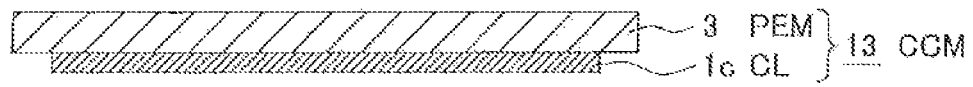
FIG. 8 is a schematic sectional view of the other example of the GDE obtained by one preferred embodiment according to the producing method of the present invention.

For example, the GDE may have a configuration of a GDE 1C shown in FIG. 8.

FIG. 8 is a schematic sectional view of the other example of the GDE obtained by one preferred embodiment according to the producing method of the present invention. The GDE 1C shown in FIG. 8 has a configuration a micro porous layer (MPL) is not disposed between the catalyst layer 1c and the gas diffusion layer 1gd in comparison with the GDE 1B shown in FIG. 7.

<Fuel Cell Stack>

Figure 9:
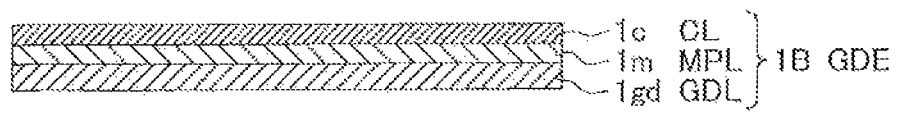
FIG. 9 is a schematic view of the fuel cell stack having the GDE or the MEA obtained by one preferred embodiment according to the producing method of the present invention.

FIG. 9 is a schematic view of one example of the fuel cell stack having the GDE or the MEA obtained by one preferred embodiment according to the producing method of the present invention.

The fuel cell stack 30 shown in FIG. 9 has a configuration where a plurality of unit cell which is the MEA 10 shown in FIG. 1 is stacked. Further, the fuel cell stack 30 has a configuration where the MEA 10 is disposed between the separator 4 and the separator 5. Both in the separator 4 and the separator 5, a gas flow pass is formed.

(Producing Method of Gas Diffusion Electrode)

Next, a preferred embodiment of the producing method of the present invention explained.

The producing method of the gas diffusion electrode according to the present embodiment has a first step for subjecting a supporting body layer having electron conductivity, repellent property and gas diffusion properly to a water immersion treatment, a second step for preparing a catalyst layer forming ink by mixing with stirring constitutional materials of the catalyst layer forming ink in a mixer, a third step for forming a catalyst layer on the surface of the supporting body layer obtained in the first step by using the catalyst layer forming ink.

The water immersion treatment in the first step is a treatment that affinity with the catalyst layer forming ink is ensured temporarily by immersing at least a part of the supporting body layer into water to wet at least a part of the surface of the supporting body layer where the catalyst layer is formed, or by injecting water temporarily under pressure into fine pores near the surface.

Here, when the configuration of the gas diffusion electrode is the same configuration of the GDE 1B shown in FIG. 7, the MPL 1m is a supporting body layer. Alternatively, when the configuration of the gas diffusion electrode is the same configuration of the GDE 1C shown in FIG. 8, the GDE is a supporting body layer.

The water immersion treatment is not particularly limited to a specific treatment, if the affinity with the catalyst layer forming ink is ensured temporarily by wetting the surface (or fine pores near the surface) of the supporting body layer where the catalyst layer is formed. As a preferred embodiment of the water immersion treatment, for example, there may be employed a treatment where a supporting body layer is disposed on a buffer material which has water absorbing property and softening property and contains water (ion exchanged water), and the supporting body layer is immersed into water (ion exchanged water), and then is moved up and down by pushing the supporting body layer intermittently. As the other preferred embodiment of the water immersion treatment, there may be employed a treatment where a sealable pressure resistant vessel such as autoclave is charged with ion exchanged water and the supporting body layer, and then, pressure and heating treatment is carried out under a certain pressure, at a certain temperature and for a certain period of time which are previously determined through experiments. In such case, by adjusting the position of the supporting body layer in the pressure resistant vessel, the water immersion treatment of the supporting body layer may be earned out by using at least one of the ion exchanged water in the vapor state and the ion exchanged water in the liquid state in the pressure resistant vessel.

In the second step, the catalyst layer forming ink is prepared by mixing with stirring constitutional materials of the catalyst layer forming ink in a mixer.

Here, the catalyst layer forming ink according to the present embodiment contains the core-shell catalyst, the polyelectrolyte, water and the polyhydric alcohol. Any monohydric alcohol having 1 to 3 carbon atoms is not contained.

In the second step, as a preferred method for preparing the catalyst layer farming ink, there may be employed a method where the core-shell catalyst and the "aqueous dispersion of polyelectrolyte" and the polyhydric alcohol are introduced to a mixer and are mixed with stirring.

Furthermore, in this method, it is preferable that the method is earned out through a step (step A) where the core-shell catalyst and water are mixed with stilling in the mixer, a step (step B) where the aqueous dispersion of polyelectrolyte is introduced into the mixer and is mixed with stirring, and a step (step C) where the polyhydric alcohol is introduced into the mixer and is mixed with stirring.

Thereby, it is more easy and reliable to make the dispersing state of the core-shell catalyst in the catalyst layer forming ink better.

The polyhydric alcohol is not particularly limited so far as that the dispersion state of the core-shell catalyst in the aqueous dispersion when mixing with the aqueous dispersion of the polyelectrolyte.

Further, the preferred polyhydric alcohol may be, for example, a dihydric alcohol, or a trihydric alcohol. Preferred examples of the dihydric alcohol include ethylene glycol, diethylene glycol, tetraethylene glycol, propylene glycol polyethylene glycol, 1,3-butanediol, 1,4-butanediol, and the like. Preferred examples of the trihydric alcohol include glycerol, and the like. Among these dihydric and trihydric alcohols, preferable is an alcohol having a relatively lower carbon atoms from the viewpoint of compatibility with water, and more preferable is an alcohol which can be obtained industrially stably in a low price, and has none or extremely low toxic property, and has excellent viscous adjusting ability. From these points of view, glycerol and polyethylene glycols are preferable.

Here, the aqueous dispersion of the polyelectrolyte is not particularly limited as far as the monohydric alcohol having 1 to 3 carbon atoms is not contained and water is the main component of the dispersing medium. Water content of the aqueous dispersion of the polyelectrolyte is preferably 85 wt % or more. The state where "the monohydric alcohol having 1 to 3 carbon atoms is not contained" is a level that the monohydric alcohol having 1 to 3 carbon atoms is not detected by quantitative analysis of the components of the aqueous dispersion of the polyelectrolyte. For example, as commercially available aqueous dispersion of the polyelectrolyte, there are a trade name "DE1021CS" (water content: 87 to 90 wt %, content of 1-propanol and ethanol: 0% (lower than detection limit of quantitative analysis) available from DuPont, and a trade name "DE1020CS" (water content: 87 to 90 wt %, content of 1-propanol and ethanol: 0% (lower than detection limit of quantitative analysis) available from DuPont.

The composition ratio of the core-shell catalyst, the polyelectrolyte, other components (water, alcohol, etc.) which are contained in the catalyst layer forming ink is properly formulated so as to make the dispersion state of the core-shell catalyst in the obtained catalyst layer better, and to improve the power generation performance of the MEA which contains the catalyst layer.

From the viewpoint that sufficient catalyst activity can be obtained, the catalyst layer forming ink according to the present embodiment contains the core-shell catalyst, the polyelectrolyte and the main component and a mass ratio N/C where a mass C of the support of the core-shell catalyst and a mass N of the polyelectrolyte is preferably 0.5 to 1.5, more preferably 0.5 to 1.2, further preferably 0.7 to 1.0.

The mixer used in the second step is not particularly limited, and there may be used a ball mill, an ultrasonic dispersing machine, a stirring tank.

Further, in the producing method of the present embodiment, the mixing conditions of the second step are so determined that, when the core-shell catalyst is used, an introducing amount (total amount) of the constitutional materials of the catalyst layer forming ink to the mixer is reduced in comparison with the conventional case where the Pt/C catalyst is used.

Namely, the catalyst layer forming ink is prepared so as to satisfy the condition shown in the following equation (1) which is determined by referring a second catalyst layer forming ink where only the core-shell catalyst among the constitutional materials included in the catalyst layer forming ink is substituted by a Pt on carbon catalyst, and the N/C is regulated within the range of 0.5 to 1.5;

$$X1<X2 \qquad (1)$$

Wherein, in the equation (1), X1 represents a total mass of the constitutional materials of the catalyst layer forming ink introduced into the mixer, and X2 represents a total mass of the constitutional materials of the second catalyst layer forming ink which is previously required when preparing the second catalyst layer forming ink under the same mixing conditions as in the catalyst layer forming ink excepting the introduced materials.

Further, in the producing method of the present embodiment, the mixing conditions of the second step are so determined that, when the core-shell catalyst is used, a stilling power in the mixer is lowered in comparison with the conventional case where the Pt/C catalyst is used. Thereby, it is possible to reduce the damage of the core-shell catalyst due to the stirring surely.

Namely, the catalyst layer forming ink is prepared so as to satisfy the condition shown of the following equation (2) which is determined by referring a second catalyst layer forming ink where only the core-shell catalyst among the constitutional materials included in the catalyst layer forming ink is substituted by a Pt on carbon catalyst, and the N/C is regulated within the range of 0.5 to 1.5;

$$P1<P2 \qquad (2)$$

Wherein, in the equation (2), P1 represents a stilling power in the mixer, and P2 represents a stirring power in the mixer with respect to the second catalyst layer forming ink which is previously required when preparing the second catalyst layer forming ink under the conditions where the total mass of the constitutional materials to be introduced into the mixer is the same.

According to the aforementioned equation (3) and the equation (4), when the conditions (Np, d, etc.) of the geometrical structure of the mixer are the same, and the viscosity $\mu$, the density $\rho$, and the Reynold's number Re of samples (mixture of constitutional materials of the catalyst layer forming ink) to be introduced into the mixer are made almost same by adjusting the N/C within the above given range, the stirring power can mainly be controlled by the rotational speed.

Further, since a relative weight acceleration Gn applied to a unit weight of the sample in the mixer also depends on the rotational speed of the mixer, from this point of view, it is important to control the rotational speed of the mixer preferably.

In case that a planetary ball mil is used as a mixer, a relative weight acceleration Gn of the planetary ball mill is represented by the aforementioned equation (5).

According to the equation (5), when the conditions of the geometric structure of the mixer are same, it is understood that Gn can mainly be controlled by the rotational speed n of the revolution of the mixer.

Further, according to the producing method of the present embodiment, in the third step, the catalyst layer is formed on the surface of the supporting body layer obtained in the first step by using the catalyst layer forming ink.

Here, the methods for forming the catalyst layer on the surface of the supporting body layer in the third step is not particularly limited, and there can be employed a known method. For example, there are used a bar coating method, a die coating method, a doctor blade method, a spraying method, and the like.

EXAMPLE

In the following, the present invention is more specifically explained by referring working examples, but the present invention is not limited to the following working examples.
(I) Prevision of Electrode Catalyst Used for Catalyst Layer of Cathode of MEA
(1) Production of Core-Shell Catalyst Used for Cathode of MEA of Examples 1 to 16, Comparative Examples 1 to 2
["Pt/Pd/C" Powder Where the Shell Part of Pt is Formed on Pd/C]

A "Pt/Pd/C" powder {Pt support rate: 24.3 wt % (result of ICP analysis), Trade name "NE-F10224-BC", available from N. E. CHEMNAT} where the shell part of Pt is formed on Pd of the particle of the following "Pd/C" powder was prepared as a core-shell catalyst (hereinafter referred to a "core-shell catalyst A").

This Pt/Pd/C powder was prepared by using the following Pd/C powder, forming a coating film of Cu on the surface of the core particle of Pd of Pd/C by means of a general Cu-UPD method, and then using potassium chloroplatinate to carry out the galvanic substitution reaction of Cu and Pt.
[Core Particle Supporting Carbon "Pd/C" Powder]

A "Pd/C" powder {Pd support rate: 30 wt %, Trade name "NE-F00230-C" available from N. E. CHEMNAT} where the core particles of the Pd are supported on a carbon black powder was prepared.

The Pd/C powder was obtained by preparing a mixed solution of a commercially available carbon black powder (specific surface area of 750 to 800 m2/g), sodium tetrachloropalladate(II) and water, and adding a reducing agent thereto, and then reducing palladium ion in the solution.

<Measurement (ICP Analysis) of Support Rate>

With respect to the core-shell catalyst A, the support rate of Pt (wt %) and the support rate of Pd (wt %) were measured by the following method.

The core-shell catalyst A was immersed in an aqua regia to dissolve the metal. Then, carbon as an insoluble component was removed from the aqua regia. Next, the aqua regia from which carbon has been removed was subjected to ICP analysis.

As a result of the ICP analysis, the core-shell catalyst had a support rate of Pt of 24.3 wt % and a support rate of Pd of 21.1 wt %.

<Measurement (XRD analysis) of Average Value of Crystallite Size>

With respect to the core-shell catalyst A, an average value of crystallite size measured by powder X-ray diffraction (XRD) (an average value calculated from the peak of Pd(111) plane of the core part) was measured. As a result, an average value of crystallite size of the core-shell catalyst A was 4.9 nm.

<Surface Observation and Structural Observation of Electrode Catalyst>

With respect to the core-shell catalyst A, the STEM-HAADF image and the EDS elemental mapping image were observed. As a result, it was confirmed that, in each case, the electrode catalyst had a structure where the catalyst particles having a core-shell structure where a layer of the shell part of Pt was formed on at least a past of the surface of the parade of the core part of Pd were supported on the electrically conductive carbon support.

(2) Production of Core-Shell Catalyst used for Cathode of MEA of Comparative Example 3

["Pt/Pd/C" Powder Where the Shell Part of Pt is Formed on Pd/C]

A "Pt/Pd/C" powder {Pt support rate: 20.4 wt % (result of ICP analysis), Trade name "NE-F10224-BC", available from N. E. CHEMNAT} where the shell part of Pt is formed on Pd of the particle of the following "Pd/C" powder was prepared as a core-shell catalyst (hereinafter referred to a "core-shell catalyst AA").

This Pt/Pd/C powder was prepared by using the following Pd/C powder, forming a coating film of Cu on the surface of the core particle of Pd of Pd/C by means of a general Cu-UPD method, and then using potassium chloretplatinate to cany out the galvanic substitution reaction of Cu and Pt.

[Core Particle Supporting Carbon "Pd/C" Powder]

The "Pd" powder {Pd support rate: 30 wt %, Trade name "NE-F00230-C", available from N. E. CHEMNAT} used in the above Examples 1 to 16 and Comparative Examples 1 to 2 was prepared.

<Measurement (ICP analysis) of Support Rate>

With respect to the core-shell catalyst AA, the support rate of Pt (wt %) and the support rate of Pd (wt %) were measured in the same manner as in the above Examples 1 to 16 and Comparative Examples 1 to 2.

As a result of the ICP analysis, the core-shell catalyst had a support rate of Pt of 20.4 wt % and a support rate of Pd of 22.43 wt %.

<Measurement (XRD analysis) of Average Value of Crystallite Size>

With respect to the core-shell catalyst A, an average value of crystallite size measured by powder X-ray diffraction (XRD) (an average value calculated from the peak of Pd(111) plane of the core part) was measured. As a result, an average value of crystallite size of the core-shell catalyst A was 4.5 nm.

<Surface Observation and Structural Observation of Electrode Catalyst>

With respect to the core-shell catalyst AA, the STEM-HAADF image and the EDS elemental mapping image were observed. As a result, it was confirmed that, in each case, the electrode catalyst had a structure where the catalyst particles having a core-shell structure where a layer of the shell part of Pt was formed on at least a part of the surface of the particle of the core part of Pd were supported on the electrically conductive carbon support.

(3) Prevision of Pt/C Catalyst used for Cathode of MEA of Comparative Example 4

As a Pt/C catalyst, a Pt/C catalyst (Trade name: "NE-F50") having a Pt support rate of 50 wt % available from N. E. CHEMNAT was prepared. This catalyst was prepared by using the same support as of the above core-shell catalyst.

With respect to the Pt/C catalyst, the XRD analysis was carried out in the same manner as in the above core-shell catalyst. As a result, an average value of crystallite size was 3.1 nm.

(4) Prevision of Pt/C Catalyst Used for Cathode of MEA of Comparative Examples 5 to 6

As a Pt/C catalyst, a Pt/C catalyst (Trade name: "SA50BK") having a Pt support rate of 50 wt % available from N. E. CHEMNAT was prepared.

With respect to the Pt/C catalyst, the XRD analysis was carried out in the same maimer as in the above core-shell catalyst. As a result, an average value of crystallite size was 2.6 nm.

(II) Prevision of P/C Catalyst used for Anode of MEA of Example 1 to 16 and Comparative Examples 1 to 6

As a Pt/C catalyst, a Pt/C catalyst (Trade name: "SA50BK") having a Pt support rate of 50 wt % available from N. E. CHEMNAT was prepared.

With respect to the Pt/C catalyst, the XRD analysis was carried out in the same manner as in the above core-shell catalyst. As a result, an average value of crystallite size was 2.6 nm.

Example 1

In the following procedures, an MEA having the same configuration as in the MEA 10 shown in FIG. 1 was produced.

(1) Production of Cathode

GDL of Cathode

As a GDL, a carbon paper (Trade name "TGP-H-60" available from TORAY Co., Ltd.) was prepared.

MPL Forming Ink for Cathode

A ball mill made of TEFLON (registered trademark) where balls made of TEFLON (registered trademark) were introduced was charged with 1.5 g of a carbon black powder (Trade name "DENKABLACK" available from Denka Co., Ltd.), 1.1 g of an ion exchanged water and 6.0 g of a surfactant (Trade name "TRITON"(35 wt % aqueous solution) available from DOW CHEMICAL), and then mixing was carried out.

Next, 1.75 g of a polytetrafluoroethylene (PTFE) dispersion (Trade name "31-JR" available from Du Pont-Mitsui Fluorochemicals Company, Ltd. Was added to the ball mill vessel, and was mixed. Thereby, an MPL forming ink for the cathode was produced.

MPL (Supporting Body Layer) of Cathode

A coating film was formed on one surface of the GDL by applying the MPL forming ink for cathode by using a bar coater. Thereafter, the coating film was dried sufficiently in a dryer, and then was subjected to heat treatment under pressure (360° C., 3.5 bar) to produce a laminated article (hereinafter referred to as "laminated article a") where the MPL (supporting body layer) was formed on the GDL.

First Step (Water Immersion Treatment)

A buffer material which has water absorbing property and softening property was disposed on the bottom of a vessel which has an opening at the upper portion and a bottom, and water was introduced into the vessel to immerse the buffer material with water. Next, the laminated article a was disposed on the buffer material. Next, the laminated article a was moved up and down by pressing intermittently. The up-and-down movement was continued until the surface (surface where the catalyst layer was formed) of the MPL of the laminated article a was in the state where wetted with water.

Second Step (Preparation of Catalyst Layer Forming Ink for Cathode)

<Step A> Mixing with Stirring of Core-Shell Catalyst and Water

A mixer (planetary ball mill of "Classic Line P-7" available from Fritsch Co., Ltd.) provided with a ball mill made of TEFLON (registered trademark) where balls made of TEFLON (registered trademark) were introduced was charged with the aforementioned core-shell catalyst A and the ion exchanged water, and then mixing was carried out.

<Step B> Mixing of Aqueous Dispersion of Polyelectrolyte to Mixture of Core-Shell Catalyst and Water Next by introducing an aqueous dispersion of a polyelectrolyte {10 % Nafion aqueous dispersion (Trade name "DE1021CS" available from DUPONT)} into the ball mill vessel, and the core-shell catalyst A and water and Nafion were mixed with stilling.

<Step C> Mixing of Polyhydric Alcohol to Mixture of Core-Shell Catalyst and Water and Polyelectrolyte Next, after introducing glycoside to the ball mill vessel, the mixture of the core-shell catalyst A and water and Nafion and glyceride were mixed with stilling to produce a catalyst layer forming ink for cathode.

The N/C of this ink was 0.5. In addition, a ratio of carbon in the core-shell catalyst A: ion exchanged water: glyceride was 1:10:0.8 (mass ratio).

Furthermore, the mixing by using the planetary ball mill was conducted under the condition where the "revolution" due to rotation of a disc where the ball mill vessel was fixed and the "rotation" of the ball mill vessel itself were generated at the same time. Specific conditions were as follows. The rotation speed shown in Table 1 is the rotation speed in the step C.

Step A: 500 rpm (revolution), 1000 rpm (rotation) 5 minutes

Step B: 800 rpm (revolution), 1200 rpm (rotation) 1 minute

Step C: As shown in the following, mixing with stirring was carried out separately twice, and the second mixing was carried out in the reversed relation direction.

600 rpm (revolution), 1200 rpm (rotation) 15 minutes 600 rpm (revolution (reverse)), 1200 rpm (rotation) 15 minutes Catalyst layer (CL) of Cathode A coating film was formed on the surface of the MPL of the aforementioned laminated article a by applying the catalyst layer forming ink for cathode by bar coating method. After drying the coating film at room temperature for 30 minutes, further drying was carried out at 60° C. for 1.0 hour. Next, the glyceride was removed to obtain the catalyst layer.

Therefore, a cathode of gas diffusion electrode was produced. The Pt support amount of the catalyst layer of the cathode was regulated so as to be the value shown in Table 1.

(2) Production of Anode

GDL of Anode

As a GDL, the same carbon paper for the cathode was prepared.

MPL forming ink for anode

A ball mill made of TEFLON (registered trademark) where balls made of TEFLON (registered trademark) were introduced was charged with 1.5 g of a carbon black powder (Trade name "DENKABLACK" available from Denka Co., Ltd.), 1.0 g of an ion exchanged water and 6.0 g of a surfactant (Trade name "TRITON" (35 wt. % aqueous solution.) available from DOW CHEMICAL) and then mixing was carried out.

Next, 2.5 g of a polytetrafluoroethylene (PTFE) dispersion (Trade name "31-JR" available from Du Pont-Mitsui Fluorochemicals Company, Ltd. Was added to the ball mill vessel, and was mixed. Thereby, an MPL forming ink for the anode was produced.

MPL of Anode

A coating film was formed on one surface of the GDL by applying the MPL forming ink for the cathode by using a bar coater. Thereafter, the coating film was dried sufficiently in a dryer, and then was subjected to heat treatment under pressure (360° C., 13.8 bar) to produce a laminated article where the MPL was formed on the GDL.

Catalyst Layer Forming Ink for Anode

A ball mill made of TEFLON (registered trademark) where balls made of TEFLON were introduced was charged with SA50BK (Pt support rate 50 wt % and the ion exchanged water and a 5 wt% alcohol dispersion of Nafion (Trade name "Nafion 5 wt. % dispersion" Product No. "274704" available from SIGMA-ALDRICH) and glyceride, and then mixing was carried out to produce a catalyst layer forming ink for anode. The N/C of this ink was 1.2. In addition, a ratio of carbon in the SA50BK: ion exchanged water: glyceride was 1:6:4 (mass ratio).

Catalyst Layer (GL) of Anode

A coating film was formed on the surface of the MPL of the aforementioned laminated article where the MPL was formed on the GDL by applying the catalyst layer forming ink for anode by liar coating method. After drying the coating film at room temperature for 30 minutes, further drying was carried out at 60° C. for 1.0 hour. Next, the glyceiide was removed to obtain the catalyst layer. Therefore, an anode of gas diffusion electrode was produced. The Pt support amount of the catalyst layer of the anode was 0.30 mg/cm$^{2.}$ (3) Production of MEA A polymer electrolyte membrane (Trade name "Nafion NR212" available from DUPONT) was prepared. A laminated article where the polymer electrolyte membrane was disposed, between the cathode and the anode was produced, and then the laminated article was pressed with heating by using a hot press machine to obtain an MEA. The pressing with heating was carried out at 140° C. under 18.5 bar for 5 minutes, and further at 140° C. under 88.8 bar for 3 minutes.

Example 2 to Example 6

Each MEA was produced by using the same conditions and procedures as in Example 1 excepting that, with respect to the catalyst layer of the cathode, the composition of the catalyst layer forming ink for cathode and the application condition of the ink were controlled so that the Pt support amount and the N/C were the values shown in Table 1.

Comparative Example 1

Trial for producing MEA by using the same conditions and procedures as in Example 1 was conducted, excepting that, with respect to the catalyst layer of the cathode, the composition of the catalyst layer forming ink for cathode and the application condition of the ink were controlled set that the Pt support amount and the N/C were the values shown in Table 1, and the water immersion treatment of the first step was not carries out. However, the catalyst layer forming ink for cathode could not be applied on the MPL well, and thus a catalyst layer of the cathode could not be formed well. Therefore, an MEA could not be produced.

Comparative Example 2

Trial for producing MEA by using the same conditions and procedures as in Example 1 was conducted, excepting that, with respect to the catalyst layer of the cathode, the composition of the catalyst layer forming ink for cathode and the application condition of the ink were controlled set that the Pt support amount and the N/C were the values shown in Table 1, and the water immersion treatment of the first step was not carries out. However, the catalyst layer forming ink for cathode could not be applied on the MPL well, and thus a catalyst layer of the cathode could not be formed well. Therefore, an MEA could not be produced.

Comparative Example 3

MEA was produced by using the same conditions and procedures as in Example 1 excepting that, with respect to the catalyst layer of the cathode, the following conditions were changed.
Namely, in the production of the catalyst layer forming ink for cathode,
*the aforementioned core-shell catalyst AA was used instead of the core-shell catalyst A;
*a 5 wt % Nafion alcohol dispersion (Trade name "DE520CS" available from DUPONT; containing 48 wt % of 1-propanol) was used instead of 10 wt % Nafion aqueous dispersion;
* the composition of the catalyst layer forming ink for cathode and the application condition of the ink were controlled so that the Pt support amount and the N/C were the values shown in Table 1;
*the water immersion treatment of the first step was not carried out.

Comparative Example 4

MEA was produced by using the same conditions and procedures as in Example 1 excepting that, with respect to the catalyst layer of the cathode, the following conditions were changed.
Namely, in the production of the catalyst layer forming ink for cathode,
*the aforementioned P/C catalyst (Trade name: "NE-F50") was used instead of the core-shell catalyst A;
*a 5 wt % Nation alcohol dispersion (Trade name "DE520CS" available from DUPONT; containing 48 wt % of 1-propanol) was used instead of 10 wt % Nation aqueous dispersion;
* the composition of the catalyst layer forming ink for cathode and the application condition of the ink were controlled so that the Pt support amount and the N/C were the values shown in Table 1;
*the water immersion treatment of the first step was not carried out;
*carbon: ion exchanged water : glyceride in the P/C catalyst (Trade name: "NE-F50") was 1:10:1 (mass ratio).

Comparative Example 5 to Comparative Example 6

Each MEA was produced by using the same conditions and procedures as in Comparative Example 3 excepting that, with respect to the catalyst layer of the cathode, the following conditions were changed.
Namely, in the production of the catalyst layer forming ink for cathode,
*the aforementioned P/C catalyst (Trade name: "SA50BK") was used instead of the core-shell catalyst A;
* the composition of the catalyst layer forming ink for cathode and the application condition of the ink were controlled so that the Pt support amount and the N/C were the values shown in Table 1;
*the water immersion treatment of the first step was not carried out.

Example 7

MEA was produced by using the same conditions and procedures as in Example 2 excepting that, with respect to the catalyst layer of the cathode, the composition of the catalyst layer forming ink for cathode and the application condition of the ink were controlled so that the Pt support amount and the N/C were the values shown in Table 1, and the total mass of the constitutional materials of the catalyst layer forming ink to be introduced into the ball mill vessel was ½.

Example 8

MEA-was produced by using the same conditions and procedures as in Example 7 excepting that, with respect to the catalyst layer of the cathode, the composition of the catalyst layer forming ink for cathode and the application condition of the ink were controlled so that the Pt support amount and the N/C were the values shown in Table 1, and the following conditions were employed as the conditions of the mixing with stilling (rotation speed). The rotation speed shown in Table 1 is the rotation speed in the step C.
Step A: 500 rpm (revolution), 1000 rpm (rotation) 5 minutes
Step B: 600 rpm (revolution), 1200 rpm (rotation) 1 minute
Step C: As shown in the following, mixing with stirring was carried out separately twice, and the second mixing was carried out in the reversed rotation direction.
700 rpm (revolution), 1400 rpm (rotation) 15 minutes
700 rpm (revolution (reverse)), 1400 rpm (rotation) 15 minutes Example 9

MEA was produced by using the same conditions and procedures as in Example 7 excepting that, with respect to the catalyst layer of the cathode, the composition of the catalyst layer forming ink for cathode and the application condition of the ink were controlled so that the Pt support amount and the N/C were the values shown in Table 1, and the following conditions were employed as the conditions of the mixing with stirring (rotation speed). The rotation speed shown in Table 1 is the rotation speed in the step C.

Step A: 400 rpm (revolution), 800 rpm (rotation) 5 minutes

Step B: 400 rpm (revolution), 800 rpm (rotation) 1 minute

Step C: As shown in the following, mixing with stirring was carried out separately twice, and the second mixing was carried out in the reversed rotation direction.

400 rpm (revolution), 800 rpm (rotation) 15 minutes 400 rpm (revolution (reverse)), 800 rpm (rotation) 15 minutes Example 10

MEA was produced by using the same conditions and procedures as in Example 7 excepting that, with respect to the catalyst layer of the cathode, the composition of the catalyst layer forming ink for cathode and the application condition of the ink were controlled so that the Pt support amount was the values shown in Table 1, and the following conditions were employed as the conditions of the mixing with stirring (rotation speed). The rotation speed shown in Table 1 is the rotation speed in the step C.

Step A: As shown in the following, mixing with stirring was carried out separately twice 300 rpm (revolution), 600 rpm (rotation) 5 minutes 400 rpm (revolution), 800 rpm (rotation) 2 minutes Step B: 300 rpm (revolution), 600 rpm (rotation) 1 minute Step C: As shown in the following, mixing with stirring was carried out separately twice, and the second mixing was carried out in the reversed rotation direction.

300 rpm (revolution), 600 rpm (rotation) 15 minutes 300 rpm (revolution (reverse)), 600 rpm (rotation) 15 minutes Example 11 to Example 14

Each MEA was produced by using the same conditions and procedures as in Example 9 excepting that, with respect to the catalyst layer of the cathode, the composition of the catalyst layer forming ink for cathode and the application condition of the ink were controlled so that the Pt support amount was the values shown in Table 1.

Example 15

With respect to the catalyst layer of the cathode, in the second step, the step A and the step B were not carried out, and the procedures of the step A and the step B were carried out at the same time instead. Namely, the core-shell catalyst and water and the polyelectrolyte were mixed at the same time with stirring. Thereafter, the step C was carried out to produce the catalyst layer forming ink for cathode. MEA was produced by using the same conditions and procedures as in Example 9 excepting the change of the above procedures.

Example 16

MEA was produced by using the same conditions and procedures as in Example 9 excepting that, with respect to the catalyst layer of the cathode, the heat treatment under pressure of the MPL was carried out at 360° C. 13.8 bar; the composition of the catalyst layer forming ink for cathode and the application condition of the ink were controlled so that the Pt support amount and the N/C were the values shown in Table 1.

<Battery Performance Evaluation>

The battery performance of each MEA obtained according to the producing methods of Examples 1 to 16 and Comparative Examples 1 to 6 was evaluated by the following battery performance evaluation method.

Firstly, each MEA was set on a fuel cell unit cell evaluation device (available from CHINO Corporation). Next, the power generation reaction proceeded inside the MEA under the following condition.

Namely, a temperature of the unit cell (MEA) was 80° C. A pure hydrogen of 1.0 atm which was humidified with a saturated vapor was supplied to the anode by regulating a flow rate so that a utilizing percentage of hydrogen was 70%. Further, a pure oxygen of 1.0 atm which was humidified with a saturated vapor of 80° C. was supplied to the anode by regulating a flow rate so as to be 50%.

The evaluation of the unit cell (MEA) was conducted by controlling a current with an electron load device included in the fuel cell unit cell evaluation device, a current-voltage curve was obtained as data by scanning the current value from 0 to 1.0 A/cm$^2$.

From the data of the thus obtained current-voltage curve, a graph (not shown) where an X axis (current density) was represented by a logarithmic scale was prepared by plotting the data, and then a current density value (current value per unit area of electrode) at a voltage of 850 mV was obtained.

The thus obtained current density value was divided by a weight of platinum per unit area of the cathode to calculate an activity (Mass. Act.) per unit weight of platinum contained in the cathode, and the activity was used as an index of oxygen reduction ability of the catalyst contained in the cathode. The results are shown in Table 1 to Table 5.

In table 1 to Table 5, the Mass. Act. obtained in Example 1 is assumed to be standard (1.0), the Mass. Act. obtained in the other Examples and Comparative Examples is shown as a relative value (relative ratio).

Further, the value of the rotation speed of the ball mill (planetary ball mill of "Classic line P-7" available from Fritsch Co., Ltd.) shown in Table 1 to Table 5 shows the rotation speed of the "revolution" of the disc which fixes the ball mill vessel (rotation speed in the step C). Though being not shown in Table 1 to Table 5, practically, the "rotation" of the ball mill vessel was simultaneously done, and the rotation speed of the rotation is set to be twice of the revolution speed.

TABLE 1

| | Configuration of electrode catalyst for cathode | Water immersion treatment of support body layer of cathode | Nafion dispersion of catalyst layer forming ink for cathode | Amount of catalyst layer forming ink for cathode to be introduced to ball mill (relative value of mass) | Rotation speed of ball mill of catalyst layer forming ink for cathode rpm | Catalyst layer forming ink for cathode N/C | Relative value of Mass. Act. @850 mV | Crystallite size of electrode catalyst of cathode nm | Pt support rate of electrode catalyst of cathode wt % | Pd support rate of electrode catalyst of cathode wt % | Pt support amount of cathode mg/cm² | Pd support amount of cathode mg/cm² |
|---|---|---|---|---|---|---|---|---|---|---|---|---|
| Ex. 1 | Pt/Pd/C | Did | Aqueous | 1 | 600 | 0.5 | 1.0 | 4.9 | 24.3 | 21.1 | 0.11 | 0.30 |
| Ex. 2 | Pt/Pd/C | Did | Aqueous | 1 | 600 | 0.7 | 1.0 | 4.9 | 24.3 | 21.1 | 0.12 | 0.30 |
| Ex. 3 | Pt/Pd/C | Did | Aqueous | 1 | 600 | 1.0 | 1.2 | 4.9 | 24.3 | 21.1 | 0.06 | 0.30 |
| Ex. 4 | Pt/Pd/C | Did | Aqueous | 1 | 600 | 1.2 | 0.9 | 4.9 | 24.3 | 21.1 | 0.11 | 0.30 |
| Ex. 5 | Pt/Pd/C | Did | Aqueous | 1 | 600 | 0.3 | 0.7 | 4.9 | 24.3 | 21.1 | 0.10 | 0.30 |
| Ex. 6 | Pt/Pd/C | Did | Aqueous | 1 | 600 | 1.5 | 0.6 | 4.9 | 24.3 | 21.1 | 0.11 | 0.30 |
| Com. Ex. 1 | Pt/Pd/C | Non | Aqueous | 1 | 600 | 0.5 | — | 4.9 | 24.3 | 21.1 | — | — |
| Com. Ex. 2 | Pt/Pd/C | Non | Aqueous | 1 | 600 | 1.0 | — | 4.9 | 24.3 | 21.1 | — | — |
| Com. Ex. 3 | Pt/Pd/C | Non | Alcohol | 1 | 600 | 1.0 | 0.5 | 4.5 | 20.4 | 22.43 | 0.11 | 0.30 |
| Com. Ex. 4 | Pt/C | Non | Alcohol | 1 | 600 | 0.5 | 0.5 | 3.1 | 50 | 0 | 0.08 | 0.30 |
| Com. Ex. 5 | Pt/C | Non | Alcohol | 1 | 600 | 0.5 | 0.5 | 2.6 | 50 | 0 | 0.08 | 0.30 |
| Com. Ex. 6 | Pt/C | Non | Alcohol | 1 | 600 | 0.5 | 0.5 | 2.6 | 50 | 0 | 0.14 | 0.30 |

TABLE 2

| | Configuration of electrode catalyst for cathode | Water immersion treatment of support body layer of cathode | Nafion dispersion of catalyst layer forming ink for cathode | Amount of catalyst layer forming ink for cathode to be introduced to ball mill (relative value of mass) | Rotation speed of ball mill of catalyst layer forming ink for cathode rpm | Catalyst layer forming ink for cathode N/C | Relative value of Mass. Act. @850 mV | Crystallite size of electrode catalyst of cathode nm | Pt support rate of electrode catalyst of cathode wt % | Pd support rate of electrode catalyst of cathode wt % | Pt support amount of cathode mg/cm² | Pd support amount of cathode mg/cm² |
|---|---|---|---|---|---|---|---|---|---|---|---|---|
| Ex. 2 | Pt/Pd/C | Did | Aqueous | 1 | 600 | 0.7 | 1.0 | 4.9 | 24.3 | 21.1 | 0.12 | 0.30 |
| Ex. 7 | Pt/Pd/C | Did | Aqueous | ½ | 600 | 0.7 | 1.3 | 4.9 | 24.3 | 21.1 | 0.11 | 0.30 |

TABLE 3

| | Configuration of electrode catalyst for cathode | Water immersion treatment of support body layer of cathode | Nafion dispersion of catalyst layer forming ink for cathode | Amount of catalyst layer forming ink for cathode to be introduced to ball mill (relative value of mass) | Rotation speed of ball mill of catalyst layer forming ink for cathode rpm | Catalyst layer forming ink for cathode N/C | Relative value of Mass. Act. @850 mV | Crystallite size of electrode catalyst of cathode nm | Pt support rate of electrode catalyst of cathode wt % | Pd support rate of electrode catalyst of cathode wt % | Pt support amount of cathode mg/cm² | Pd support amount of cathode mg/cm² |
|---|---|---|---|---|---|---|---|---|---|---|---|---|
| Ex. 8 | Pt/Pd/C | Did | Aqueous | ½ | 700 | 0.7 | 0.9 | 4.9 | 24.3 | 21.1 | 0.11 | 0.30 |
| Ex. 7 | Pt/Pd/C | Did | Aqueous | ½ | 600 | 0.7 | 1.0 | 4.9 | 24.3 | 21.1 | 0.11 | 0.30 |
| Ex. 9 | Pt/Pd/C | Did | Aqueous | ½ | 400 | 0.7 | 1.1 | 4.9 | 24.3 | 21.1 | 0.09 | 0.30 |
| Ex. 10 | Pt/Pd/C | Did | Aqueous | ½ | 300 | 0.7 | 0.8 | 4.9 | 24.3 | 21.1 | 0.01 | 0.30 |

TABLE 4

| | Configuration of electrode catalyst for cathode | Water immersion treatment of support body layer of cathode | Nafion dispersion of catalyst layer forming ink for cathode | Amount of catalyst layer forming ink for cathode to be introduced to ball mill (relative value of mass) | Rotation speed of ball mill of catalyst layer forming ink for cathode rpm | Catalyst layer forming ink for cathode N/C | Relative value of Mass. Act. @850 mV | Crystallite size of electrode catalyst of cathode nm | Pt support rate of electrode catalyst of cathode wt % | Pd support rate of electrode catalyst of cathode wt % | Pt support amount of cathode mg/cm² | Pd support amount of cathode mg/cm² |
|---|---|---|---|---|---|---|---|---|---|---|---|---|
| Ex. 11 | Pt/Pd/C | Did | Aqueous | ½ | 400 | 0.5 | 0.8 | 4.9 | 24.3 | 21.1 | 0.11 | 0.30 |
| Ex. 9 | Pt/Pd/C | Did | Aqueous | ½ | 400 | 0.7 | 1.0 | 4.9 | 24.3 | 21.1 | 0.09 | 0.30 |
| Ex. 12 | Pt/Pd/C | Did | Aqueous | ½ | 400 | 0.8 | 1.1 | 4.9 | 24.3 | 21.1 | 0.09 | 0.30 |
| Ex. 13 | Pt/Pd/C | Did | Aqueous | ½ | 400 | 1 | 0.7 | 4.9 | 24.3 | 21.1 | 0.10 | 0.30 |
| Ex. 14 | Pt/Pd/C | Did | Aqueous | ½ | 400 | 1.2 | 1.0 | 4.9 | 24.3 | 21.1 | 0.10 | 0.30 |
| Ex. 16 | Pt/Pd/C | Did | Aqueous | ½ | 400 | 0.7 | 1.1 | 4.9 | 24.3 | 21.1 | 0.10 | 0.30 |

TABLE 5

| | Configuration of electrode catalyst for cathode | Water immersion treatment of support body layer of cathode | Nafion dispersion of catalyst layer forming ink for cathode | Amount of catalyst layer forming ink for cathode to be introduced to ball mill (relative value of mass) | Rotation speed of ball mill of catalyst layer forming ink for cathode rpm | Catalyst layer forming ink for cathode N/C | Relative value of Mass. Act. @850 mV | Second step |
|---|---|---|---|---|---|---|---|---|
| Ex. 9 | Pt/Pd/C | Did | Aqueous dispersion | ½ | 400 | 0.7 | 1.0 | Nafion was mixed after mixing catalyst and water |
| Ex. 15 | Pt/Pd/C | Did | Aqueous dispersion | ½ | 400 | 0.7 | 0.8 | Catalyst and water and Nafion were mixed sumltaneously |

From the results shown in Table 1, it has been found clearly that the MEA obtained according to the producing method of Example 1 to Example 6 can give a higher Pt mass activity in comparison with the MEA obtained according to Comparative Examples 1 to 6.

More specifically, as the result of the comparison of Example 1 to Example 6 with Comparative Examples 4 to 6, it has been confirmed the priority where the core-shell catalysts are employed instead of the conventional Pt/C catalysts.

Further, as the result of the comparison of Example 1 to Example 6 with Comparative Example 3, it has been made clear that, in case that the core-shell catalyst is employed, when an alcohol is used as a dispersing medium of the catalyst layer forming ink, it is effective that only the polyhydric alcohol is used without using a monohydric alcohol having 1 to 3 carbon atoms.

Furthermore, as the result of the comparison of Example 1 to Example 6 with Comparative Examples 1 to 2, it has been confirmed that the water immersion treatment is effective in the first step. In Comparative Examples 1 to 2 where the water immersion treatment was not employed, even if the value of the N/C of catalyst layer forming ink is changed, the catalyst layer could not be formed on the MPL in good condition.

From the results shown in Table 2, it has been found that, when preparing the catalyst layer forming ink which contains the core-shell catalyst by using the bail mill (mixer), with respect to the total mass of the constitutional materials of the catalyst layer forming ink to be introduced into the ball mill (mixer), it is effective that an amount (X1) smaller than a conventionally preferred amount (X2) which is previously required for the second catalyst layer forming ink containing the Pt/C catalyst is introduced.

From the results shown in Table 3, it has been found that, when preparing the catalyst layer forming ink which contains the core-shell catalyst by using the ball mill (mixer), with respect to the stirring power in the ball mill (mixer), it is effective that an amount (P1) smaller than a conventionally preferred amount (P2) which is previously required for the second catalyst layer forming ink containing the Pt/C catalyst, is introduced. Namely, it has been confirmed that it is effective that the rotation speed of the ball mill (mixer) (one of parameters to determine the stirring power, or, one of parameters to determine a relative gravity center acceleration which is loaded per unit mass of sample in the ball mill) is lower than a conventionally preferred rotation speed (here 600 rpm) winch is previously required for the second catalyst layer forming ink containing the Pt/C catalyst.

From the results shown in Table 4, it has been found clearly that, when preparing the catalyst layer forming ink which contains the core-shell catalyst, regardless the conventionally preferred N/C given value (here N/C=0.5) which is previously required for the second catalyst layer forming ink containing the Pt/C catalyst, it is important to determine a new value of N/C.

From the results shown in Table 5, it has been found clearly that, when preparing the catalyst layer forming ink by using the mixer, the method where the core-shell catalyst, and water are previously mixed in the mixer and then Nafion is admixed is effective than the method where the core-shell catalyst and water and Nafion are simultaneously mixed in the mixer.

As is clear from the above results, according to the producing method of the MEA (or the producing method of the GDE) of the present embodiment, it is possible to improve the battery performances when the core-shell catalyst is used as the electrode catalyst more exactly, and to contribute the lowering the PEFC cost.

APPLICABILITY TO INDUSTRIES

According to the producing method of the present invention, it is possible to provide a method for producing the gas diffusion electrode which contains the core-shell catalyst and exhibits excellent electrode performances, and the membrane electrode assembly which can exhibit excellent battery performances more exactly.

Therefore, the present invention can be applied not only to electric device industries such as fuel cells, fuel cell cars and mobile phones, but also to ene farm, cogeneration system, and the like, and thus can contribute to the development of energy industry and environmental technique related industry.

EXPLANATION OF SYMBOLS

1: Cathode
1A, 1B, 1C: Gas diffusion electrode (GDE)
1c: Catalyst layer (CL)
1m: Micro porous layer (MPL
1gd: Gas diffusion layer (GDL)
2: Anode
2c: Catalyst layer (CL)
2m: Micro porous layer (MPL)
2gd: Gas diffusion layer (GDL)
3: Polymer electrolyte membrane (PEM)
4, 5: Separator
10, 11: membrane electrode assembly (MEA)
20, 20A, 20B, 20C: Core-shell catalyst
22: Support
23, 23a, 23b, 23c: Catalyst particle
24: Core part
24s: Exposed surface of core part
25: First shell part
25s: Exposed surface of first shell part
26, 26a, 26b, 26c: Shell part
27: Second, shell part
30: Fuel cell stack

The invention claimed is:

1. A method for producing a gas diffusion electrode which is provided with a polymer fuel cell comprises:
a first step for subjecting a supporting body layer having electron conductivity, repellent property and gas diffusion property to a water immersion treatment,
a second step for preparing a catalyst layer forming ink by mixing with stirring constitutional materials of the catalyst layer forming ink in a mixer,
a third step for forming a catalyst layer on the surface of the supporting body layer obtained in the first step by using the catalyst layer forming ink; and
the catalyst layer forming ink comprising:
a core-shell catalyst which contains a support containing an electrically conductive carbon material as a constitutional component, and catalyst particles having a core-shell structure which are carried on the support,
a polymer electrolyte,
water, and
an alcohol;
wherein the alcohol is only a polyhydric alcohol and does not include a monohydric alcohol having 1 to 3 carbon atoms.

2. The method for producing a gas diffusion electrode according to claim 1, wherein the polyhydric alcohol is glyceride.

3. The method for producing a gas diffusion electrode according to claim 1, wherein the supporting body layer is a gas diffusion layer (GDL).

4. The method for producing a gas diffusion electrode according to claim 1, wherein the supporting body layer is a micro porous layer (MPL).

5. The method for producing a gas diffusion electrode according to claim 1, wherein, in the second step,
a mass ratio N/C which is a ratio of a mass C of the support of the core-shell catalyst and a mass N of the polymer electrolyte is regulated to 0.5 to 1.5.

6. The method for producing a gas diffusion electrode according to claim 5, wherein, in the second step,
the catalyst layer forming ink is prepared so as to satisfy the condition shown in the following equation (1) which is determined by referring a second catalyst layer forming ink where only the core-shell catalyst among the constitutional materials included in the catalyst layer forming ink is substituted by a Pt on carbon catalyst, and the N/C is regulated within the range of 0.5 to 1.5;

$$X1<X2 \quad (1)$$

Wherein, in the equation (1), X1 represents a total mass of the constitutional materials of the catalyst layer forming ink introduced into the mixer, and X2 represents a total mass of the constitutional materials of the second catalyst layer forming ink which is previously required when preparing the second catalyst layer forming ink under the same mixing conditions as in the catalyst layer forming ink excepting the introduced materials.

7. The method for producing a gas diffusion electrode according to claim 5, wherein, in the second step,
the catalyst layer forming ink is prepared so as to satisfy the condition shown in the following equation (2) which is determined by referring a second catalyst layer forming ink where only the core-shell catalyst among the constitutional materials included in the catalyst layer forming ink is substituted by a Pt on carbon catalyst, and the N/C is regulated within the range of 0.5 to 1.5;

$$P1<P2 \quad (2)$$

Wherein, in the equation (2), P1 represents a stirring power in the mixer, and P2 represents a stirring power in the mixer with respect to the second catalyst layer forming ink which is previously required when preparing the second catalyst layer forming ink under the conditions where the total mass of the constitutional materials to be introduced into the mixer is the same.

8. A method for producing a membrane electrode assembly (MEA), which comprises a polymer electrolyte membrane, a gas diffusion electrode arranged on at least one surface of the polymer electrolyte membrane; wherein the gas diffusion electrode obtained by the method for producing the gas diffusion electrode according to claim 1 is used as a part.

\* \* \* \* \*